United States Patent
Hertling

(10) Patent No.: US 9,329,807 B2
(45) Date of Patent: May 3, 2016

(54) METHOD AND SYSTEM TO SHARE A PRINTER AND PRINT

(75) Inventor: William E. Hertling, Portland, OR (US)

(73) Assignee: HEWLETT-PACKARD DEVELOPMENT COMPANY, L.P., Houston, TX (US)

(*) Notice: Subject to any disclaimer, the term of this patent is extended or adjusted under 35 U.S.C. 154(b) by 822 days.

(21) Appl. No.: 12/581,035

(22) Filed: Oct. 16, 2009

(65) Prior Publication Data

US 2011/0090529 A1 Apr. 21, 2011

(51) Int. Cl.
*G06F 3/12* (2006.01)

(52) U.S. Cl.
CPC ............ *G06F 3/1204* (2013.01); *G06F 3/1228* (2013.01); *G06F 3/1287* (2013.01)

(58) Field of Classification Search
None
See application file for complete search history.

(56) References Cited

U.S. PATENT DOCUMENTS

| | | | |
|---|---|---|---|
| 7,042,593 B2 | 5/2006 | Matsushima | |
| 2002/0055984 A1* | 5/2002 | Chang et al. | 709/217 |
| 2003/0093670 A1* | 5/2003 | Matsubayashi | G06F 3/1212 |
| | | | 713/168 |
| 2004/0196491 A1* | 10/2004 | Uchino | 358/1.15 |
| 2005/0114759 A1 | 5/2005 | Williams et al. | |
| 2005/0132183 A1 | 6/2005 | Gearhart | |
| 2005/0134904 A1* | 6/2005 | Voskuil | 358/1.15 |
| 2006/0197968 A1* | 9/2006 | VanNostrand | 358/1.13 |
| 2007/0168216 A1 | 7/2007 | Lemelson | |
| 2007/0192717 A1 | 8/2007 | Gong et al. | |
| 2008/0155125 A1 | 6/2008 | Karstens | |
| 2009/0019141 A1* | 1/2009 | Bush et al. | 709/223 |
| 2010/0302579 A1* | 12/2010 | Nuggehalli | G06F 3/1203 |
| | | | 358/1.15 |

* cited by examiner

*Primary Examiner* — Miya J Cato
(74) *Attorney, Agent, or Firm* — HP Inc. Patent Department

(57) ABSTRACT

In one embodiment, an instruction to share a printer is received at a print service, via a network, from a first user that is a member of a social networking service. A print job is received at the print service, via the network, from a second user that is a member of the social networking service. The print job is sent, via the network, to the printer to print.

17 Claims, 9 Drawing Sheets

66

| Print to Friend's Printer | Share Your Printer | Print to Paid Service |

How would you like to share your printer?

☒ From Front Panel of Printer

☐ Printer Proxy (requires download)

Next

Enable Printing via Social Network Serviice:

☒ Enabled     ☐ Disabled

Social Networking
Service Login:    [          ]
Password:         [          ]
                         [ Connect ]

FIG. 7

| Print to Friend's Printer | Share Your Printer | Print to Paid Service |

Choose from the following list of friend's printers:

| Who | Distance | Printer Type |
|---|---|---|
| ☒ Adam | 1 miles | color inkjet |
| ☐ Bill | 6 miles | color inkjet |
| ☐ Charlie | 15 miles | high capacity laser printer |

Next

72

| Print to Friend's Printer | Share Your Printer | Print to Paid Service |

Printing to Adam's Printer: 1 mile away

You can print three different ways. By email, file upload, or Social Networking Service printer driver.

- By email: adams_printer_1234@hpprintercloud.com (then attach files to be printed by email)

- By file upload. Choose file, then Hit Upload:

[_____] [Browse for File]   [ Upload ]

- By printer driver. Download Social Networking printer driver.

FIG. 9

METHOD AND SYSTEM TO SHARE A PRINTER AND PRINT

BACKGROUND

Many computer users do not own, or have ready access to, a printing device. Other computer users own one or more printing devices, but frequently cannot access these printing devices. Users in both groups may desire to print to a printing device owned by another.

BRIEF DESCRIPTION OF THE DRAWINGS

The accompanying drawings illustrate various embodiments and are a part of the specification. The illustrated embodiments are merely examples and do not limit the scope of the claims. Throughout the drawings, identical reference numbers designate similar, but not necessarily identical elements.

FIGS. 6-9 depict screen shots of user interfaces, according to embodiments.

The same part numbers designate the same or similar parts throughout the figures.

DETAILED DESCRIPTION OF EMBODIMENTS

Making arrangements to share a printer and printing to a shared printing device can be tedious and error prone. Various embodiments described below were developed in an effort to provide a practical method and system to share a printer and print. Embodiments utilize existing social networking service trust relationships and utilize a social networking service's computers or web site to facilitate communications regarding finding and sharing the printer and printing to that printer. The embodiments shown in the accompanying drawings and described below are non-limiting examples. Other embodiments are possible and nothing in the accompanying drawings or in this Detailed Description of Embodiments should be construed to limit the scope of the disclosure, which is defined in the Claims.

The following description is broken into sections. The first, labeled "Environment," describes an exemplary environment in which embodiments may be implemented. The second section, labeled "Components" describes various physical and logical components utilized to implement various embodiments. The third section, labeled as "Operation", describes exemplary embodiments of a method to share a printer and print. The third section, labeled "Example," describes example of user interfaces that may be implemented in various embodiments.

ENVIRONMENT

Figure 1:
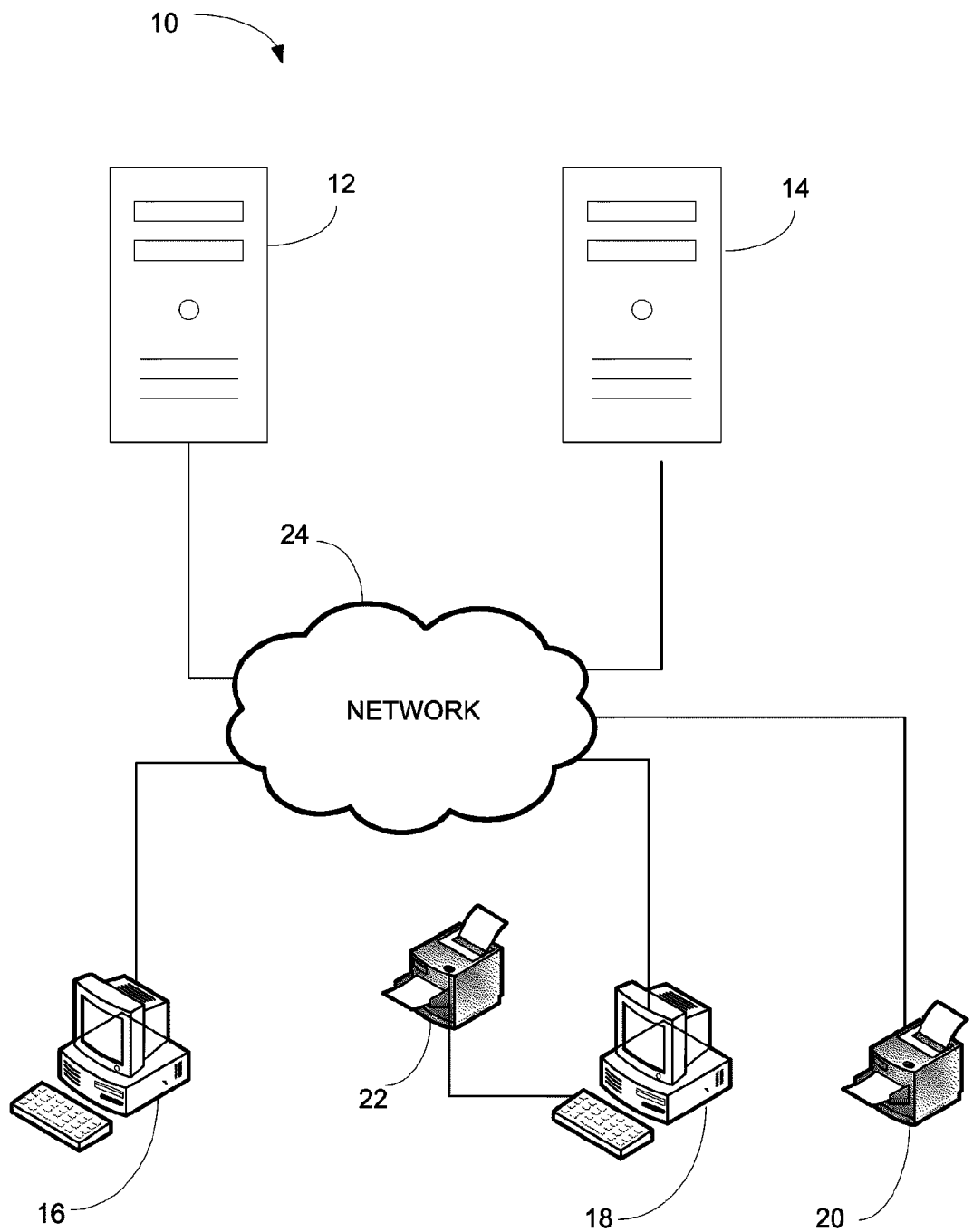
FIG. 1 depicts an exemplary environment in which embodiments may be implemented.

FIG. 1 depicts exemplary environment 10 in which embodiments may be implemented. Environment 10 includes a first server 12 (hereinafter referred to as a social networking service server or SNS server), a second server 14 (hereinafter referred to as the print application server), a first client 16, and a second client 18. The exemplary environment 10 includes a first printer 20 interconnected via the network 24, and/or a second printer 22 that connects directly to the second client 18 via a cable or wireless or other means, without connecting to the network 24.

The SNS server 12 and print application server 14 represent generally any computing devices capable of serving requested content to a first client 16, second client 18 or first printer 20 via network 24, or to second printer 22 via a proxy run on second client 18. The term content refers to visual and audible information that can be presented to a user of first client 16, second client 18, first printer 20 or second printer 22. Examples include text, still, images, audio, and video. Content can also include instructions designed to be processed by a first client 16, second client 18, first printer 20 or second printer 22. Examples include HTML code and various scripts. The term proxy includes a memory resident software application that receives from a network messages intended for a printer and sends the messages on to the printer, and that receives messages from the printer and sends the messages via the network to another computing device.

The SNS server is a server hosted by a social networking service. As used in this specification and the appended claims, a "social networking service" includes any online or web based service that facilitates the sharing of information and the establishing of online relationships by digitally mapping a member's real-world social connections, and make relationship recommendations based on trust. Examples of such social networking services are Facebook, MySpace, Twitter, Bebo, Orkut, and LinkedIn. In an example, a social networking service may utilize the SNS server to host a web page, to facilitate communication via email or instant messaging, and/ or to make third party applications.

In an exemplary social networking service, a first individual may send an invitation to a second individual to be a friend. As used in this specification and the appended claims, a "friend" indicates a fellow member of a social networking service that has been given special rights or access based on a trust relationship. Such trust may be based on prior real-world or online experiences with that fellow member, or may be granted indiscriminately. Some social networking services use the word "friend" to designate a trust relationship, and others may use other words to demonstrate an online relationship. For example, LinkedIn may refer to a "connection", Twitter may refer to a "follower" and Classmates.com may refer to a "classmate" to indicate a trust relationship. As used in this specification and the appended claims, "friend" includes these and any other designations of trust utilized by these and other social networking services. In an embodiment, a social networking service may have multiple trust relationships, all of which may be considered equivalent to a "friend" for purposes of this specification and the appended claims. If the second individual accepts the invitation and agrees to be a friend of the first individual, a friend relationship is established. This friend relationship may enable the first individual to view some or all of the content of the second individual's personal page (e.g. status postings, pictures, and lists of other friends) and vice versa. Social networking services may provide a variety of ways for "friends" to interact, e.g. e-mail, instant messaging accessing each other's personal web pages.

First client 16 and second client 18 represent generally any computing devices capable of receiving content from and communicating with SNS server 12 or print application server 14 via network 24. First client 16 and second client 18 are also responsible for receiving and processing responses to the requests. Processing can include displaying visual content such as text, images, and motion video on a display device as well as broadcasting audio content via one or more speakers. As used in this Detailed Description of Embodiments, "first user" includes, but is not limited to, a user that utilizes a computing device to communicate with the SNS server 12 and the print application server 14 via the network 24. As used in this Detailed Description of Embodiments, "second user" includes, but is not limited to, a user other than the first user that utilizes a computing device to communicate with the SNS server and the print application server 14 via the network 24. These examples of a "first user" and a "second user" set forth in this paragraph are non-limiting examples. Other embodiments are possible and nothing in the accompanying drawings or in this Detailed Description of Embodiments relating to a "first user", "second user", "first client" or "second client" should be construed to limit the scope of the disclosure, which is defined in the Claims.

First printer 20 represents generally any printing device capable of sending requests to, and receiving requests and receiving content from, SNS server 12, or print application server 14 via network 24. First printer 20 is responsible for receiving and processing responses to the requests. Processing can include printing, as well as displaying visual content such as text, images, and motion video on a display device.

Second printer 22 represents generally any printing device that connects directly to the second client 18 via a cable or wireless or other means, and which is capable of sending requests to, and receiving requests and receiving content from, the second client 18. In an embodiment, the second printer 22 receives messages from the second client 18 via a proxy that runs on the second client 18. Printer 22 is responsible for receiving and processing responses to the requests. Processing can include printing, as well as displaying visual content such as text, images, and motion video on a display device.

Network 24 represents generally one or more of a cable, wireless, fiber optic, or remote connection via a telecommunication link, an infrared link, a radio frequency link, or any other connector or system that provides electronic communication. Network 24 may represent an intranet, the Internet, or a combination of both. The paths followed by network 24 between SNS server 12, print application server 14, first client 16, second client 18 and/or first printer 20 as depicted in FIG. 1 represent the logical communication paths between these devices, not necessarily the physical paths between the devices.

COMPONENTS

Figure 2:
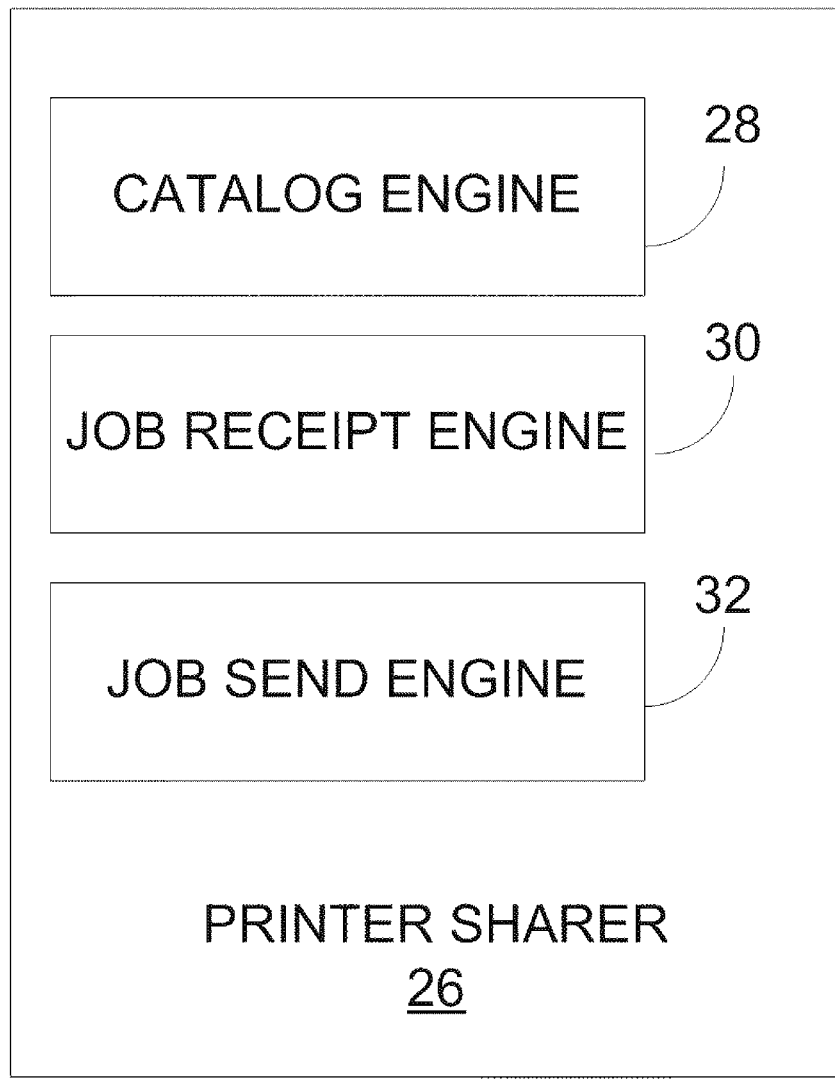
FIG. 2 depicts an exemplary printer sharer according to an embodiment.

FIG. 2 depicts an example of a printer sharer 26 referred to herein as sharer 26. Sharer 26 represents generally any combination of hardware and programming configured for use to share a printer and print. In the example of FIG. 2, sharer 26 is shown to include a catalog engine 28, a job receipt engine 30, and a job send engine 32.

Catalog engine 28 represents generally any combination of hardware and programming configured to receive, via a network, from a first user that is a member of a social networking service an instruction to share a printer. In an embodiment, the catalog engine 28 may receive, via the network, from the first user an address associated with the printer.

Job receipt engine 30 represents generally any combination of hardware and programming configured to receive, via the network, from a second user that is a member of the social networking service a print job. In an embodiment, the job receipt engine 30 is configured to send, via the network, to the second user information that the printer is available for sharing by the second user.

Job send engine 32 represents generally any combination of hardware and programming configured to send, via the network, the print job to the printer to print. In an embodiment, the job send engine 32 is operable to send the print job to the printer at an address associated with the printer, which address was received by the catalog engine 28. In an embodiment, the job send engine 32 may send, via the network, the print job to the printer to print upon confirmation that the second user is identified as a friend of the first user within the social networking service. In an embodiment, the job send engine 32 is operable to render the print job to a format that is compatible with the printer according to capabilities of the printer. In an embodiment, the job send engine 32 is operable to receive, from the printer or a proxy, a message requesting a print task.

Figure 3:
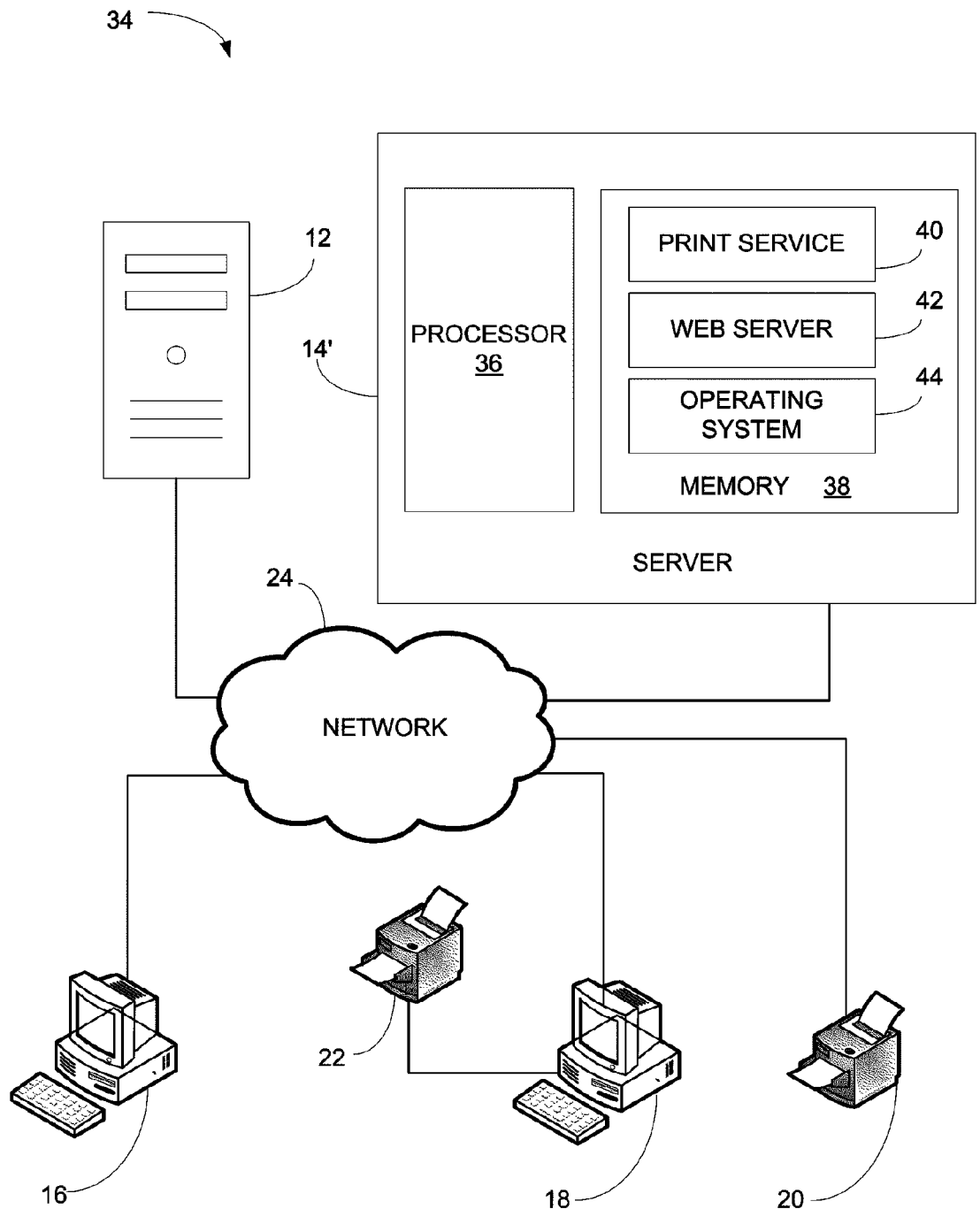
FIG. 3 depicts an implementation of the printer sharer of FIG. 2 according to an embodiment.

Sharer 26 may be implemented in a number of environments such as environment 34 of FIG. 3. Environment 34 includes a SNS server 12, a print application server 14', first client 16, and a second client 18 interconnected via the network 24. The exemplary environment 34 includes a first printer 20 interconnected via the network 24, and/or a second printer 22 that connects directly to the second client 18 via a cable or wireless or other means, without connecting the network 24. In one embodiment the first printer 20 connects to the network 24 in a manner such that first printer 20 may receive instructions and content from, and may send requests for print jobs to, the print application server 14' via the network 24. In another embodiment, the second printer 22 connects directly to the second client 18 via a cable or wireless or other means, without connecting the network 24. In this embodiment, communications from the print application server 14' to the first printer 20 may be received via the second client 18 that connects to the network 24, and then passed on to the second printer 22 by operation of a printer proxy that runs on the second client 18.

Print application server 14' is shown to include processor 36 and memory 38. Processor 36 represents generally any device capable of executing program instructions stored in memory 38. Memory 38 represents generally any memory configured to store program instructions and other data. Memory 38 is shown to include operating system 44, print service 40, and web server 42. Operating system 44 represents generally any software platform on top of which other programs or applications such as web server 42 and print service 40 run. Examples include Linux® and Microsoft Windows®.

Print service 40 represents in combination with web server 42 generally any programming that, when executed, implements the functionality of sharer 26 of FIG. 2. In particular, print service 40 in combination with web server 42, when executed by processor 36, is responsible for receiving, via a network, from a first user that is a member of a social networking service an instruction to share a printer. In doing so, print service 40 in combination with web server 42 may receive, via the network, from the first user an address associated with the printer, and capabilities of the printer. The print service 40 in combination with web server 42 may send, via the network, to a second user that is a member of the social networking service information that the printer is available for sharing by the second user. The print service 40 in combination with web server 42 receives, via the network, from the second user a print job, and renders the print job to a format that is compatible with the printer according to the capabilities. After confirming that the first user identified the second user as a friend within the social networking service, the print service 40 in combination with web server 42 sends, via the network, the print job to the printer at the address to print.

OPERATION

Figure 4:
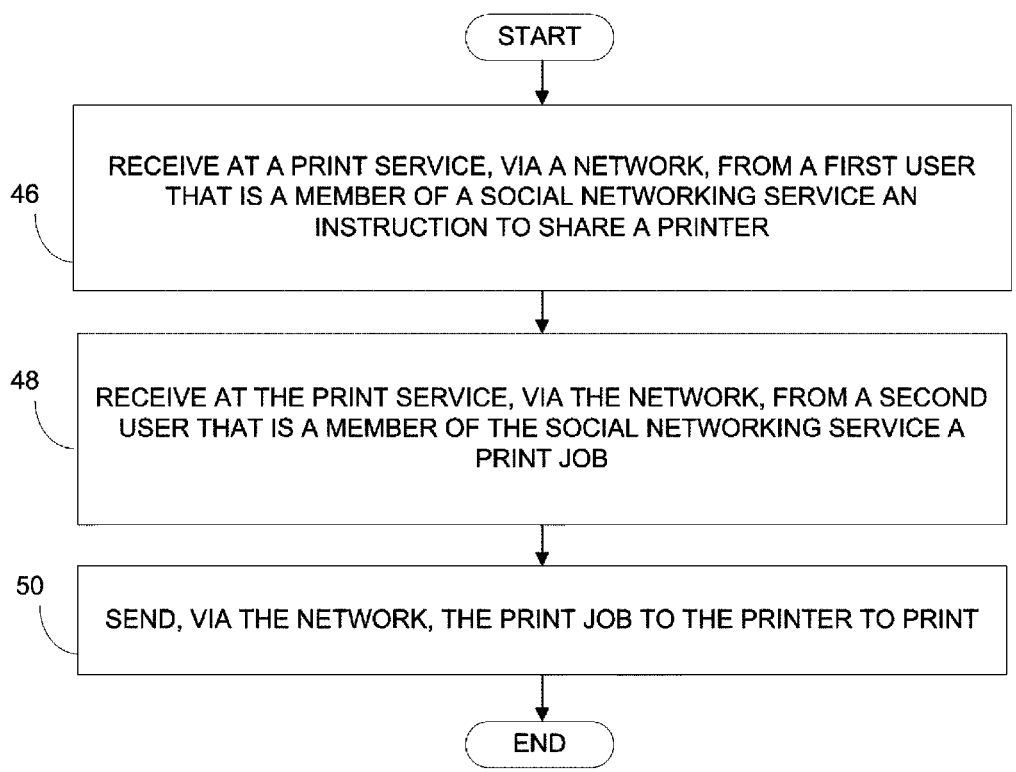
FIGS. 4-5 are exemplary flow diagrams depicting embodiments of a method to share a printer and print.
Figure 5:
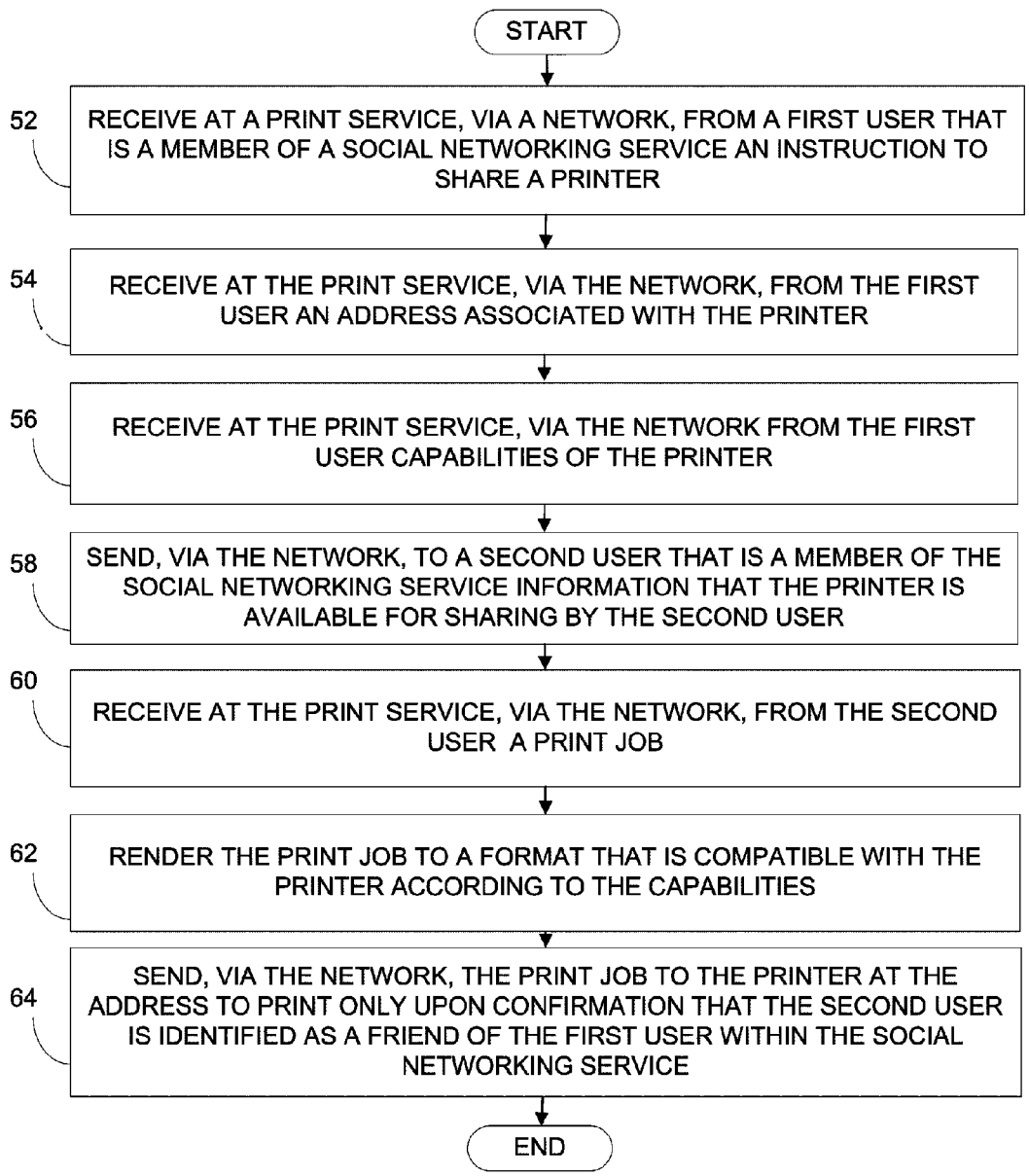

FIGS. 4-5 are exemplary flow diagrams depicting exemplary embodiments of a method to share a printer and print. In discussing FIGS. 4-5, reference may be made to the diagrams of FIGS. 1-3 to provide contextual examples. Implementation, however, is not limited to those examples.

Starting with FIG. 4, an instruction to share a printer is received at a print service, via a network, from a first user that is a member of a social networking service (block 46). Referring back to FIG. 2, catalog engine 28 may be responsible for implementing block 46. In an embodiment the instruction may be received from a first user that sent the instruction via the front panel of the printer. In an embodiment the instruction may be received from a first user that sent the instruction via a proxy operating on a computer that attaches to the printer to be shared. In an embodiment the instruction may be received from a first user that sent the instruction via a web browser accessing a social networking service server. In an embodiment the instruction may be accompanied by a login password or other information that identifies the first user as a member of the social networking service. In an embodiment the instruction may be accompanied by information that the printer is available for all friends or a subset of all friends of the first user. In an embodiment the instruction may be accompanied by information that the printer is available for a single friend of the first user.

Continuing with the flow diagram of FIG. 4, a print job is received at the print service, via the network, from a second user that is a member of the social networking service (block 48). Referring back to FIG. 2, job receipt engine 30 may be responsible for implementing block 48. In an embodiment, a request from the second user to find shared printers available to the second user for sharing may also be received by the print service, via the network.

Continuing with the flow diagram of FIG. 4, the print job is sent, via the network, to the printer to print (block 50). Referring back to FIG. 2, job send engine 32 may be responsible for implementing block 50. In an embodiment, the print service may receive a message from the printer, or from a proxy running on a computing device that electronically connects to the printer, a message requesting a print task. In an embodiment, the print job may be sent to a printer that connects directly with a print application server that runs the print service.

Moving on to FIG. 5, in a particular implementation, an instruction to share a printer is received at a print service, via a network, from a first user that is a member of a social networking service (block 52). Referring back to FIG. 2, the catalog engine 28 may be responsible for implementing block 52.

Continuing with the flow diagram of FIG. 5, an address associated with the printer is received at the print service, via the network, from the first user (block 54). Referring back to FIG. 2, the catalog engine 28 may be responsible for implementing block 54. In an embodiment, the address may be in the form of an IP address, a domain name, an email address, a printer serial number, a printer MAC address, or other unique identifier. Continuing with the flow diagram of FIG. 5, capabilities of the printer are received at the print service, via the network from the first user (block 56). Referring back to FIG. 2, the catalog engine 28 may be responsible for implementing block 56. In an embodiment, the address and capabilities are stored in a database that includes the following information regarding each printer made available for sharing: the name of the sharing user, the social networking service through which sharing is being allowed, social networking service identification information, a printer address, and printer capabilities.

Continuing with the flow diagram of FIG. 5, information that the printer is available for sharing is sent, via the network, to a second user that is a member of the social networking service (block 58). Referring back to FIG. 2, the job receipt engine 30 may be responsible for implementing block 58. In an embodiment, the information regarding the availability of the printer may sent in the form of a list of printers that are available for sharing by the second user, which list may be sorted by the distance from the second user, the printer or restrictions that the first user may have placed on the second user's use of the shared printer.

Continuing with the flow diagram of FIG. 5, a print job is received at the print service, via the network, from the second user (block 60). Referring back to FIG. 2, the job receipt engine 30 may be responsible for implementing block 60. In an embodiment the print service is capable of receiving the print job via an email address, via browser upload, or via printer driver upload. In one embodiment, the print service may make available to the second user an email address, a web link that enables upload via the second user's browser, and/or a web link that the second user may access to download a printer driver, which printer driver can be used by the second user to send the print job to the print service.

Continuing with the flow diagram of FIG. 5, the print job is rendered to a format that is compatible with the printer according to the capabilities (block 62). Referring back to FIG. 2, the job send engine 32 may be responsible for implementing block 62. In an example, rendering may include taking a print job from a native format that is not understood by the printer and converting that document and its fonts to a format or language that can be understood by the printer (e.g. PCL3, postscript, .pdf, and .jpg). If a portion of the print job is already in a format that is understood by the printer and another portion is in a format that is not understood by the printer, rendering may include converting those portions of the print job that cannot be understood by the printer.

Continuing with the flow diagram of FIG. 5, the print job is sent, via the network, to the printer at the address to print upon confirmation that the second user is identified as a friend of the first user within the social networking service (block 64). Referring back to FIG. 2, the job send engine 32 may be responsible for implementing block 64. In an embodiment that print service may communicate with the SNS before sending each print job to confirm that the second user is identified as a friend of the first user within the social networking service. In an embodiment, the print service may communicate on a periodic basis with the SNS to obtain information regarding friend status of one or more users, and store the friend status information in memory for ready access by the print service that may increase the speed of printing to a shared printer. In an embodiment, sending the print job may include sending the print job to a print job queue that is identified by a printer address. The print job may in turn be sent to the printer upon receipt of a message from the printer requesting print jobs for that printer address.

EXAMPLE

FIGS. 6-9 depict screen shots of user interfaces, according to embodiments. FIG. 6 is a screen shot of a user interface 66 that, in an embodiment, may be presented to a first user that has indicated a desire to share a printer. In an embodiment the user interface 66 might be presented to the first user by the print service via a browser window, the browser window to appear on a web page that is provided by a social network service. In this example, the user interface 66 invites the first user to share first user's printer by following share instructions on the front panel of the printer to be shared, or alternatively to enable sharing via a proxy that the first user can download from the print service.

FIG. 7 is a screen shot of a user interface 68 that, in an embodiment, may be presented to a first user that has indicated a desire to share a printer. In an embodiment the user interface 68 might be provided to the first user by the print service via a browser window, the browser window to appear on a web page that is provided by a social network service. In an embodiment the user interface 68 might be presented to the first user by a printer proxy running on a computing device. In an embodiment the print service will not proceed with the first user's instruction to share a printer unless the first user provides a social network service login identification and password. In an embodiment, the print service will not proceed with the first user's instruction to discontinue sharing of a printer unless the first user provides the social network service login identification and password.

Figure 8:

FIG. 8 is a screen shot of a user interface 70 that, in an embodiment, may be presented to a second user that has indicated a desire to print to a shared printer. In an embodiment the user interface 70 might be provided to the second user by the print service via a browser window, the browser window to appear on a web page that is provided by a social network service. In this example, the user interface 70 provides the second user with a list of printers of friends that have made printers available for sharing by the second user. In this example, the user interface 70 provided the second user with information regarding the distance to the printer and the printer type, and invites the second user to select a printer from the available list.

FIG. 9 is a screen shot of a user interface 72 that, in an embodiment, may be presented to a second user that has selected a printer that is has been made available for sharing by the second user, and that is ready to send a print job. In an embodiment the user interface 72 might be provided to the second user by the print service via a browser window, the browser window to appear on a web page that is provided by a social network service. In this example the user interface 72 provides the second user with a choice of sending a print job to the print service in three different ways: by email, by file upload, or via a printer driver. In this example if the second user chooses to send the print job via email, the print job is attached to an email and sent to the print service via email. In this example if the second user chooses to send the print job via file upload, the print job is sent to the print service via the HTTP protocol. In this example if the second user chooses to send the print job via printer driver, a printer driver is downloaded to the second user's computing device from the print service, and the print job is sent to the print service via operation of the printer driver application.

CONCLUSION

The diagram of FIG. 1 is used to depict an exemplary environment in which various embodiments may be implemented. Implementation, however, is not so limited. FIGS. 2-3 show the architecture, functionality, and operation of various embodiments. Various components illustrated in FIGS. 2-3 are defined at least in part as programs. Each such component, portion thereof, or various combinations thereof may represent in whole or in part a module, segment, or portion of code that comprises one or more executable instructions to implement any specified logical function(s). Each component or various combinations thereof may represent a circuit or a number of interconnected circuits to implement the specified logical function(s).

Also, the present disclosure may be embodied in any computer-readable media for use by or in connection with an instruction execution system such as a computer/processor based system or an ASIC (Application Specific Integrated Circuit) or other system that can fetch or obtain the logic from computer-readable media and execute the instructions contained therein. "Computer-readable media" can be any media that can contain, store, or maintain programs and data for use by or in connection with the instruction execution system. Computer readable media can comprise any one of many physical media such as, for example, electronic, magnetic, optical, electromagnetic, or semiconductor media. More specific examples of suitable computer-readable media include, but are not limited to, a portable magnetic computer diskette such as floppy diskettes or hard drives, a random access memory (RAM), a read-only memory (ROM), an erasable programmable read-only memory, or a portable compact disc.

Although the flow diagrams of FIG. 4-5 show specific orders of execution, the order of execution may differ from that which is depicted. For example, the order of execution of two or more blocks may be scrambled relative to the order shown. Also, two or more blocks shown in succession may be executed concurrently or with partial concurrence. All such variations are within the scope of the present disclosure.

The preceding description has been presented only to illustrate and describe embodiments and examples of the principles described. This description is not intended to be exhaustive or to limit these principles to any precise form disclosed. Many modifications and variations are possible in light of the above teaching.

What is claimed is:

1. A method to share a printer and print, the method comprising:
   receiving at a print service executing at a computing device, via an electronic communication network, from a first user that is a member of a social networking service an instruction to share a printer;
   presenting, via a web page provided by the social networking service, a browser window provided by the print service to the first user, wherein the browser window provides the first user with a plurality of selectable options to enable sharing of the printer including a first option to enable sharing by following an instruction on front panel of the printer and a second option to enable sharing by downloading, from the print service, a proxy to operate on a computing device attached to the printer;
   receiving a print job at the print service;
   wherein the print job is received, via the network, from a second user that is a member of the social networking service,
   wherein sending of the print job to the print service was initiated by the second user via a user interface provided by the print service via a browser window appearing on a web page provided by the social network service; and
   sending, via the network, the print job to the printer to print upon confirmation that the second user is identified as a friend of the first user within the social networking service.

2. The method of claim 1,
further comprising receiving at the print service, via the network, from the first user an address associated with the printer, and
wherein sending comprises sending the print job to the printer at the address.

3. The method of claim 1, further comprising sending, via the network, to the second user, information that the printer is available for sharing by the second user.

4. The method of claim 1, further comprising receiving at the print service, via the network from the first user an identification of a friend of the first user within the social networking service.

5. The method of claim 1, further comprising receiving at the print service, via the network from the first user capabilities of the printer, and
the method further comprising rendering the print job to a format that is compatible with the printer according to the capabilities.

6. The method of claim 1, further comprising receiving, at the print service from the printer or a proxy, a message requesting a print task.

7. A non-transitory computer readable medium storing computer executable instructions that when executed implement a method to share a printer and print, the method comprising:
receiving at a print service, via a network, from a first user that is a member of a social networking service an instruction to share a printer;
presenting, via a web page provided by the social networking service, a browser window provided by the print service to the first user, wherein the browser window provides the first user with a plurality of selectable options to enable sharing of the printer including a first option to enable sharing by following an instruction on front panel of the printer and a second option to enable sharing by downloading, from the print service, a proxy to operate on a computing device attached to the printer;
receiving a print job at the print service,
wherein the print job is received, via the network, from a second user that is a member of the social networking service;
wherein sending of the print job to the print service was initiated by the second user via a user interface provided to the second user by the print service via a browser window appearing on a web page provided by the social network service; and
sending, via the network, the print job to the printer to print after confirmation that the second user is identified as a friend of the first user within the social networking service.

8. The medium of claim 7, further comprising receiving at the print service, via the network, from the first user an address associated with the printer, and
wherein sending comprises sending the print job to the printer at the address.

9. The medium of claim 7, further comprising sending, via the network, to the second user, information that the printer is available for sharing by the second user.

10. The medium of claim 7, further comprising receiving at the print service, via the network from the first user an identification of a friend of the first user within the social networking service.

11. The medium of claim 7, further comprising receiving at the print service, via the network from the first user capabilities of the printer, and
the medium further comprising rendering the print job to a format that is compatible with the printer according to the capabilities.

12. The medium of claim 7, further comprising receiving, at the print service from the printer or a proxy, a message requesting a print task.

13. A system to share a printer and print, comprising:
a catalog engine operable to receive, via a network, from a first user that is a member of a social networking service an instruction to share a printer;
a share enable engine operable to present, via a web page provided by the social networking service, a browser window provided by the print service to the first user, wherein the browser window provides the first user with a plurality of selectable options to enable sharing of the printer including a first option to enable sharing by following an instruction on front panel of the printer and a second option to enable sharing by downloading, from the print service, a proxy to operate on a computing device attached to the printer; and
a job receipt engine operable to receive a print job,
wherein the print job is received, via the network, from a second user that is a member of the social networking service;
wherein sending of the print job to the print service was initiated by the second user via a user interface provided by the print service via a browser window appearing on a web page provided by the social network service; and
a job send engine operable to send, via the network, the print job to the printer to print following confirmation that the second user is identified as a friend of the first user within the social networking service.

14. The system of claim 13, wherein the catalog engine is operable to receive, via the network, from the first user an address associated with the printer, and
wherein the job send engine is operable to send the print job to the printer at the address.

15. The system of claim 13, wherein the job receipt engine is operable to send, via the network, to the second user information that the printer is available for sharing by the second user.

16. The system of claim 13, wherein the catalog engine is operable to receive, via the network from the first user capabilities of the printer, and
wherein the job send engine is operable to render the print job to a format that is compatible with the printer according to the capabilities.

17. The system of claim 13, including a disable share engine operable to:
receive a request from the first user to disable sharing of the printer; and
prohibit a disablement of the sharing of the printer until the first user provides a login identification and a password utilized to access a social networking service webpage.

* * * * *